United States Patent [19]

Piper

[11] 4,139,360
[45] Feb. 13, 1979

[54] METHOD OF INCLUSION MELTING GLASS WITH RADIOACTIVE COMPONENTS, AND FURNACE FOR CARRYING OUT SUCH METHOD

[75] Inventor: Helmut Piper, Lohr, Fed. Rep. of Germany

[73] Assignee: Sorg GmbH & Co. Kg, Plochsbach, Fed. Rep. of Germany

[21] Appl. No.: 814,585

[22] Filed: Jul. 11, 1977

[30] Foreign Application Priority Data

Jul. 12, 1976 [DE] Fed. Rep. of Germany ....... 2631220

[51] Int. Cl.² ............................................. C03B 5/02
[52] U.S. Cl. ........................................... 65/134; 65/27; 65/62; 65/335; 65/347
[58] Field of Search ................... 65/DIG. 4, 335, 347, 65/327, 134, 136, 27, 62; 13/6

[56] References Cited

U.S. PATENT DOCUMENTS

| 1,905,534 | 4/1933 | Wadman | 65/335 X |
| 2,186,718 | 1/1940 | Ferguson | 65/327 X |
| 2,485,851 | 10/1949 | Stevens | 13/6 |
| 3,244,494 | 4/1966 | Apple et al. | 65/335 X |

FOREIGN PATENT DOCUMENTS

| 1471853 | 12/1965 | Fed. Rep. of Germany | 13/6 |
| 2425025 | 12/1975 | Fed. Rep. of Germany | 13/6 |

OTHER PUBLICATIONS

Radioactive Waste, USAEC Div. of Tech. Inf. Extension, Oak Ridge, Tenn. Nov. 1965, by Charles H. Fox.

*Primary Examiner*—Arthur D. Kellogg
*Attorney, Agent, or Firm*—Sprung, Felfe, Horn, Lynch & Kramer

[57] ABSTRACT

A method of inclusion melting of glass with radioactive components and a furnace for carrying out the method. Radioactive components are fed in the form of an aqueous suspension or of a slurry into a furnace from above in combination with a mixture for the melt forming of glass, or the mixture for the melt forming being formed from the radioactive components. The molten mass of glass and radioactive components is heated by passing electrical current directly therethrough, wherein the mass flow takes place solely vertically from top to bottom.

11 Claims, 13 Drawing Figures

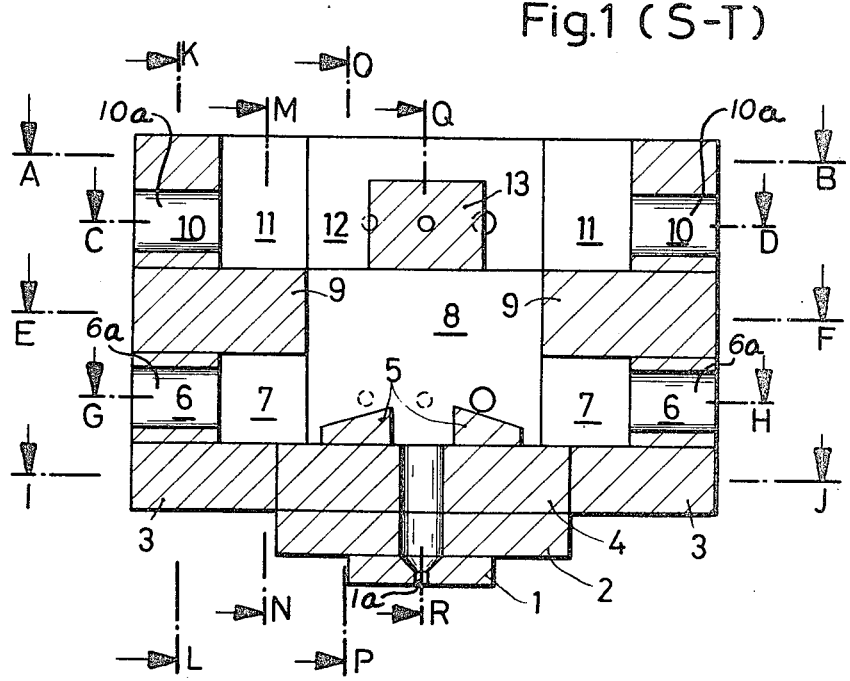
Fig.1 (S-T)
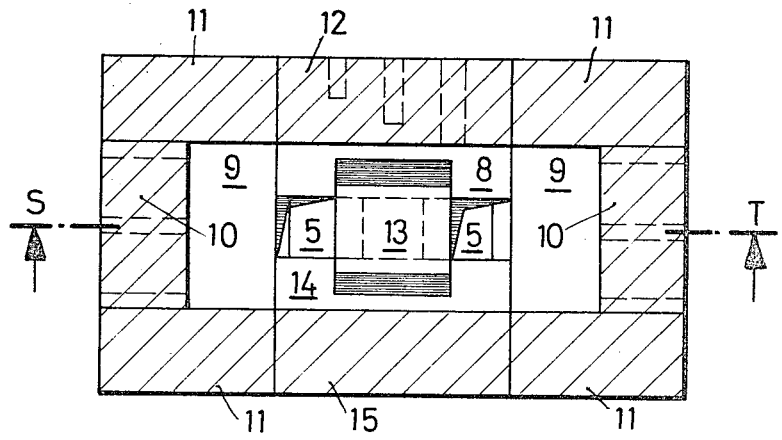
Fig.2 (A-B)

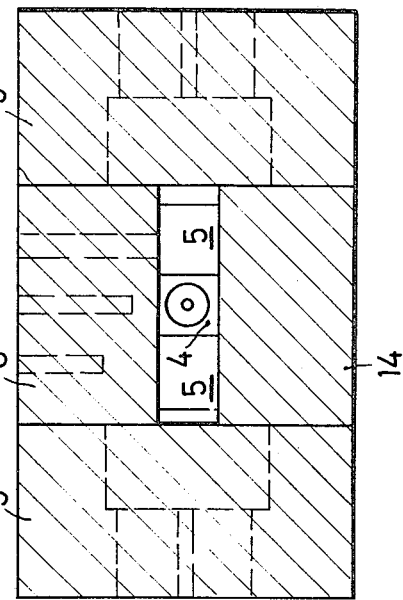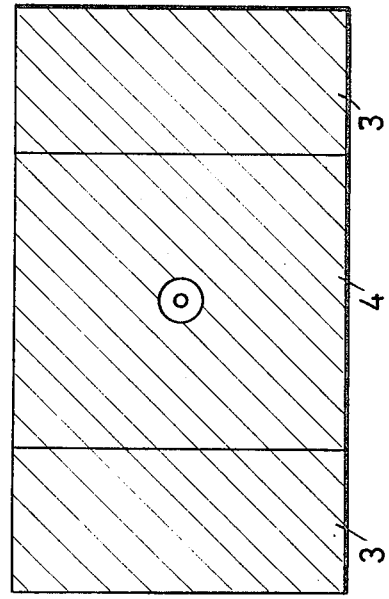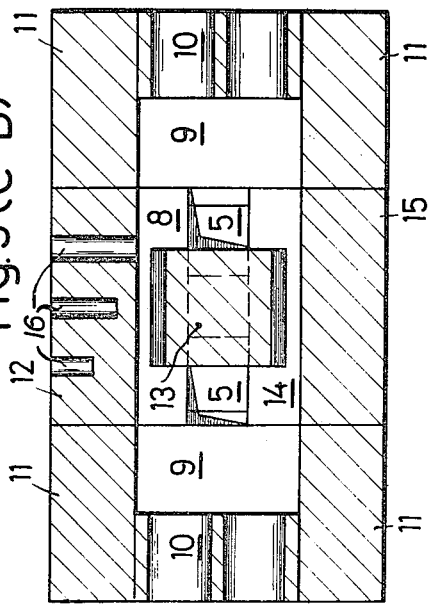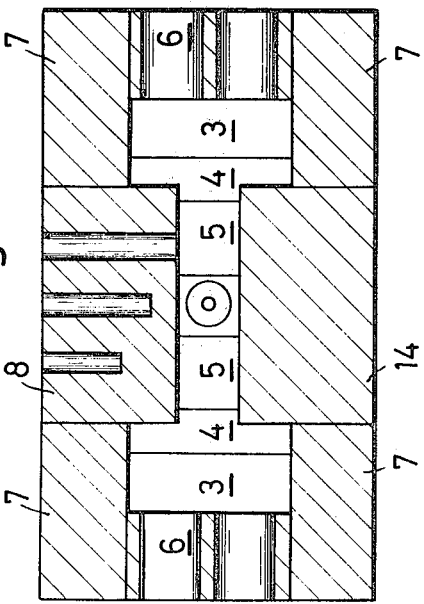

Fig.7(K-L)
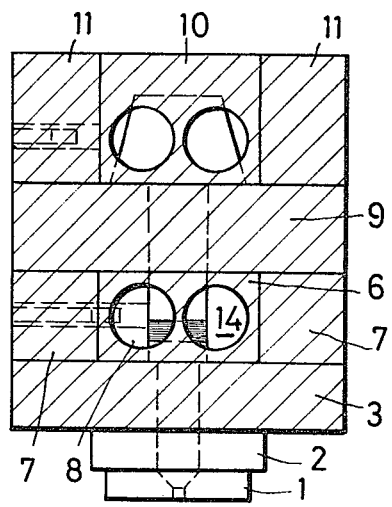
Fig.8(M-N)
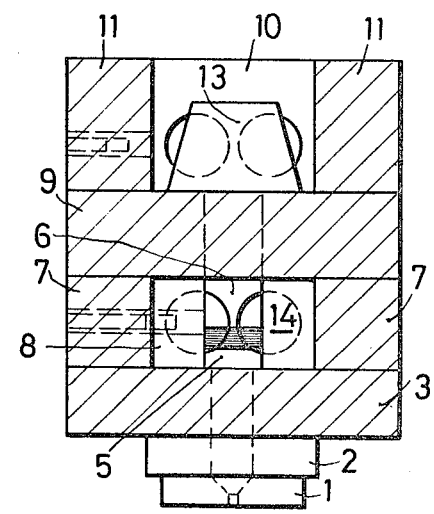
Fig.9(O-P)
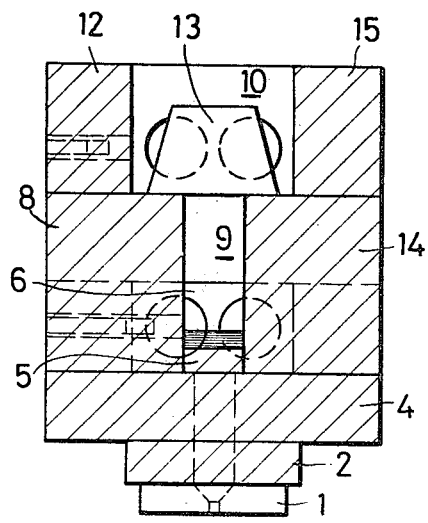
Fig.10(Q-R)
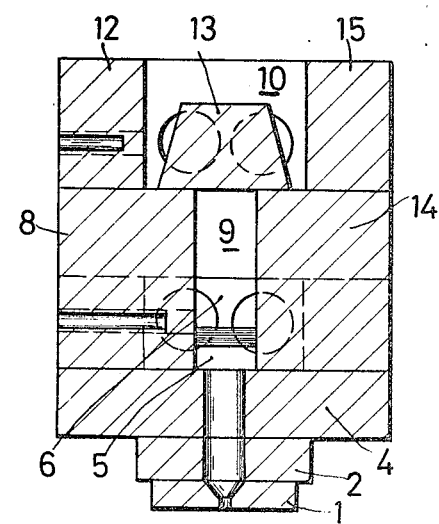

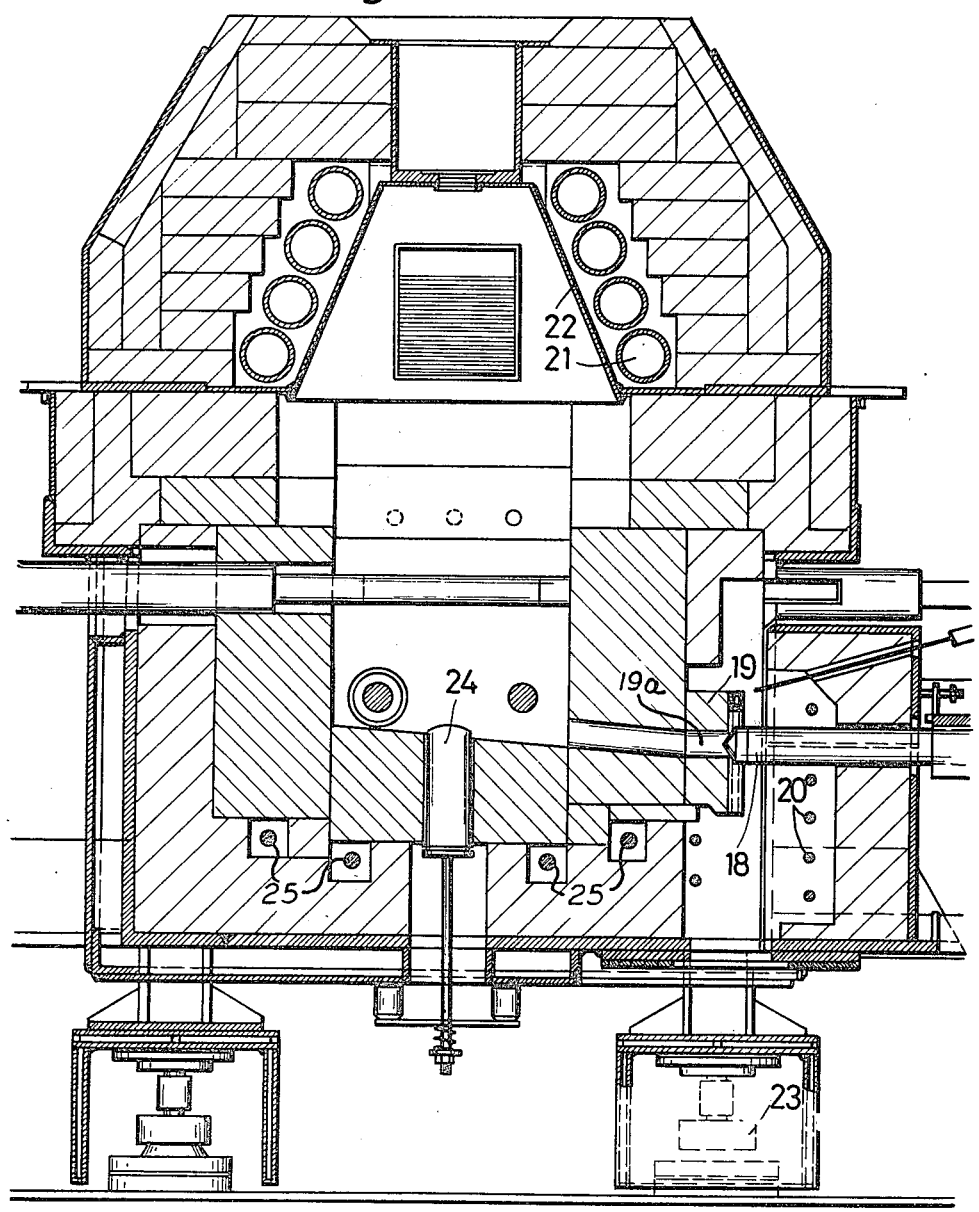

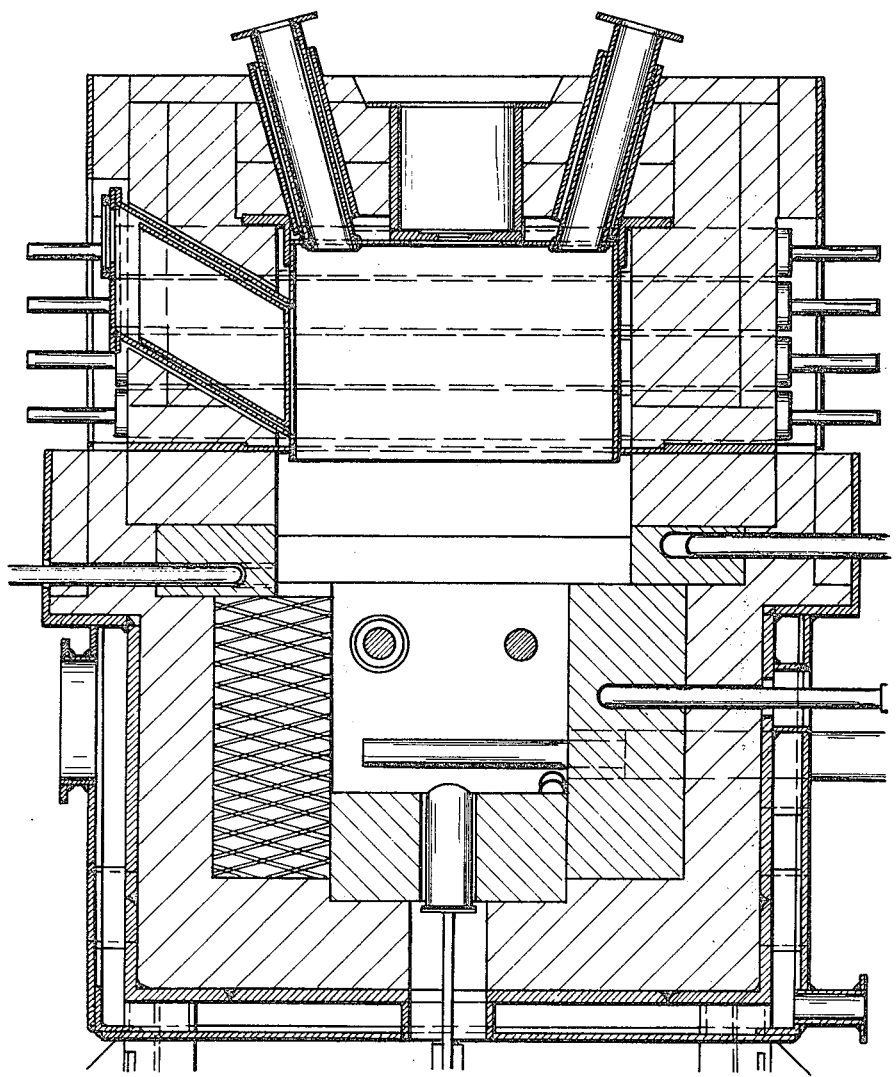
Fig.13 (XIII-XIII)

METHOD OF INCLUSION MELTING GLASS WITH RADIOACTIVE COMPONENTS, AND FURNACE FOR CARRYING OUT SUCH METHOD

BACKGROUND OF THE INVENTION

The present invention relates to a method of inclusion melting or remelting glass with radioactive components, especially from the reprocessing of nuclear fuel (burner) elements, and to a glass melting furnace for carrying out such a method.

It is known in the prior art to store radioactive waste materials in a liquid form within tanks made of stainless material, and to dissipate the heat of decay by cooling the liquid. However, it is disadvantageous in such methods that gaseous radioactive constituents may leak out, that the stainless or anti-corrosive material, as experience has taught, is corroded beyond all expectation; and that safe storage is therefore not possible, while entry of the highly radioactive liquid into the subsoil water would have catastrophic consequences.

In view of this, numerous proposals have been made to store radioactive waste materials and particularly the radioactive waste material from the reprocessing of nuclear fuel elements, in the form of a solid material after the sufficient dilution thereof. However, it has been found to be disadvantageous in such a method that the well-known solid materials, with the exception of glass, are subject to decay under the action of radioactive radiation and especially of the generated heat, such that safe storage cannot be ensured by this method either.

It is mainly the inclusion in glass that could not heretofore be effected in a technically practicable way, because of the great melting problems and the high temperatures that have to be controlled in such an operation, while the requisite safety of operation and the absence of exhaust gas cannot normally be secured. Too great a quantity of exhaust gas would result in release of radioactivity to the atmosphere, and too short an operational life or insufficient operational safety of the furnaces would impede the reliable removal of the radioactive waste materials.

SUMMARY OF THE INVENTION

Accordingly, it is the object of the present invention to provide a novel method for inclusion melting of radioactive components into glass, which method no longer suffers from the above-discussed drawbacks and in the course of which only negligibly low quantities of exhaust gas are produced, wherein a long service life of the furnaces can be expected, by which a high degree of safety of operation may be guaranteed, and wherein the desired contents of phosphate or borosilicate of the glass may be adjusted, and wherein, furthermore, the components are accessible for operation behind shield means and by remote control.

Additionally, the furnaces for carrying out the present method should be of compact construction, economical to build, and they should lend themselves to ready monitoring and observation. The furnaces for carrying out the present method should be operable even by unskilled glass workers, and the furnaces should be operable both in continuous and discontinuous modes of operation.

According to the present invention, these and other objects are solved in that the radioactive components are introduced into the furnace from above in the form of an aqueous suspension or of a slurry in combination with a mixture suitable for the melting or melt-forming of glass, that the molten mass comprising glass and radioactive components (melt) is heated by passing electrical current directly therethrough, and that the flow of the mass takes place from above to below in the vertical direction only.

Advantageously, the power supply to the molten mass may be effected through electrodes in contact with the molten mass and in order to increase the operational life of the electrodes and to substantially reduce corrosion thereof, a slight convection current may be present in the upper portion of the tank adjacent the electrodes, and measures may be taken so that in the upper portion of the central part of the furnace a higher concentration of energy is present than adjacent the edges and the electrodes. Owing to this low energy concentration, corrosion of the electrodes is reduced by the lesser amount of heat produced at the electrodes, while the energy concentration in the central part of the furnace provides the high temperatures required for the melting of the mixture in this region without allowing a caking of material to the furnace walls or increased corrosion of the walls of the furnace.

The present glass melting furnace for carrying out the above-outlined method is made of ceramic materials (Zac), it being absolutely surprising to the expert that these ceramic materials are sufficiently resistant not only to the molten, aggressive glass materials, but also to the slurry or aqueous suspension contained in the mixture. More particularly, it has been found that it is not the use of corrosion resistant steels alloyed with a high content of nickel, but rather the conventional ceramic materials as customarily used in glass furnace construction, that are most suitable for the intended purpose.

Furthermore and preferably, the furnace is provided with electrodes made of tin-oxide or molybdenum, and the furnace has in its upper portion below the deposit layer of the mixture, a greater cross-sectional area than in at least one portion therebelow in which the glass has a higher temperature.

In order to prevent stronger convection currents from occurring in the region of the electrodes, the furnace has a greater cross-sectional area in the region adjacent the upper electrodes, and these electrodes are preferably positioned within niches or recesses and/or above projections, whereby the formation of convection currents passing through the furnace is prevented.

Furthermore, the greater cross-sectional area in the upper portion of the furnace is advantageous when the furnace is operated in a discontinuous fashion whereby the batches are thusly supplied discontinuously. The level of the molten material is thereby not raised to any substantial degree even by greater batches of the mixture, and the quantity supplied may be measured by placing the furnace upon a plurality of pressure gauges, the load condition of which provides distinct information with respect to the loading of the furnace.

Also, the discontinuous mode of operation of the furnace is advantageously promoted by the fact that the glass outlet or discharge spout includes an electrode in the form of sealing brick adapted to be pressed thereagainst from the outside, which electrode is electrically connected to another electrode positioned interiorly of the furnace, whereby the current flowing from the sealing brick electrode to the inner—electrode acts to positively keep open and unobstructed the outlet or discharge passage even when no material flows therethrough. Prevention of "freezing" during pauses of operation is augmented by radiator heater elements arranged exteriorly in front of the outlet brick, the latter being adapted to be replaced if wear is observed which would affect the operation.

In order to provide for sufficient heating of the mixture including the quantity of aqueous suspension or of aqueous slurry within the upper part of the furnace, this portion of the furnace may additionally include upper furnace heating means and shield or cover means to protect the heating means against the entry of steam which would destroy the heater elements.

Below, two exemplary embodiments of the present invention are described in greater detail by referring to the drawings.

BRIEF DESCRIPTION OF THE DRAWINGS

FIG. 1 shows schematically a vertical center sectional view through the furnace according to the present invention;

FIGS. 2-6 are sectional views along lines A-B, C-D, E-F, G-H and I-J, respectively, of FIG. 1;

FIGS. 7-10 are sectional views along lines K-L, M-N, O-P and Q-R, respectively, of FIG. 1;

FIG. 11 is a vertical central sectional view through another furnace according to the present invention;

FIG. 13 is a further sectional view through the furnace of FIG. 11 in a plane normal to the sectional plane according to FIG. 11 and along line XIII—XIII of FIG. 12.

DETAILED DESCRIPTION OF THE INVENTION

Figure 12:
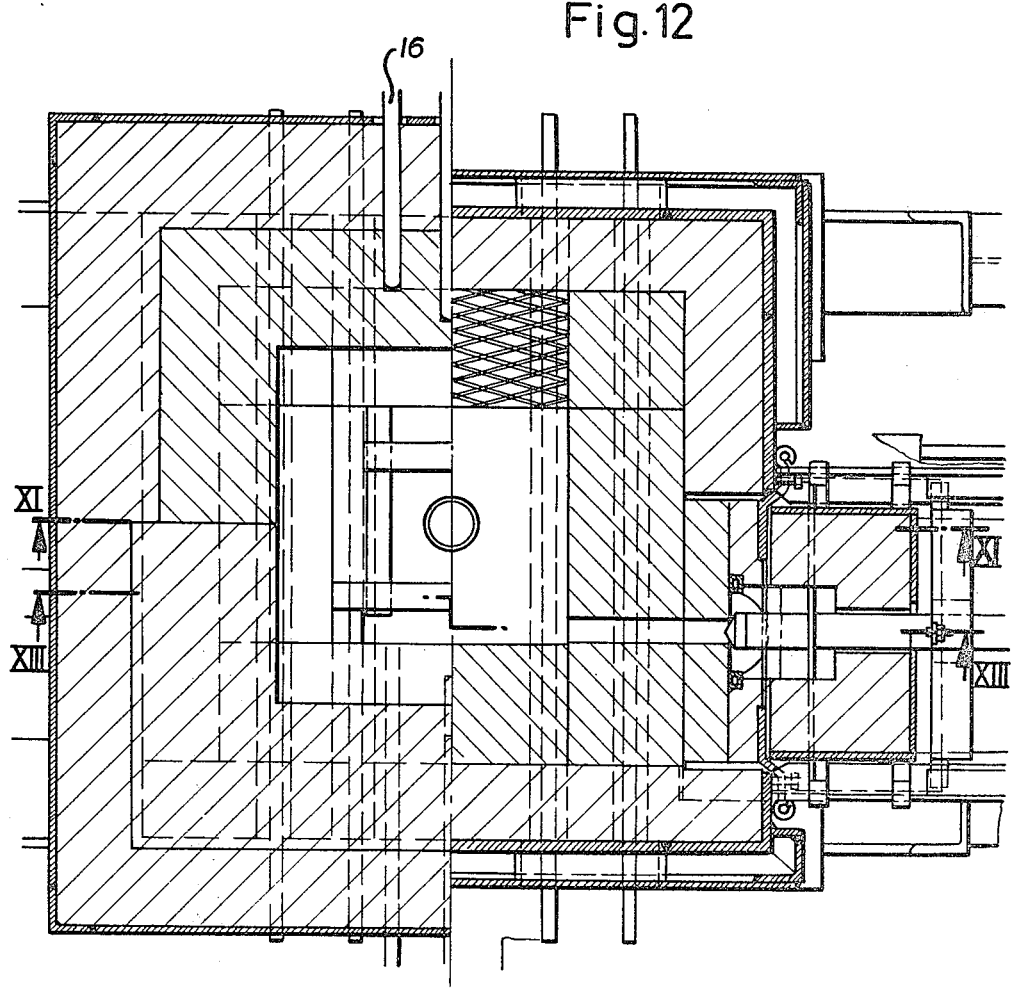
FIG. 12 shows two partial sectional views taken at different levels through the furnace according to FIG. 11.

FIGS. 1-10 show the profilated bricks of the furnace body as such, while the remainder of the structure, comprising steel beams, insulation and, optionally, water cooling means and electrodes embedded into the profilated bricks, are not illustrated.

As shown in FIGS. 1-10, the furnace comprises bottom elements 3 and 4 and a discharge brick 2 having a discharge nozzle brick having discharge nozzle 1a therein disposed therebelow. The furnace also comprises sidewalls 14 and 15, corner bricks 7 and 11, and barrier 5. For the various components of the furnace, there is provided thermocouple bricks 8 and 12 including thermocouple tube 16, electrode bricks 6 and 10 holding electrodes 6a and 10a. Additionally, bridge 9 is provided as shown.

Electrodes made of tin-oxide may be used for the furnace according to FIGS. 1-10, which electrodes are embedded into the electrode bricks 6 and 10, in a conventional manner.

The cross-sectional configuration of the present furnace changes from the uppermost level according to FIG. 2, from a rectangle into a rectangle of identical over-all dimensions, but including an interpositioned center brick in the next lower level according to FIG. 3. In the next lower level of FIG. 4, the cross-section is reduced to a rectangle of substantially smaller area, and this rectangle in turn widens in the final working level of FIG. 5 into a structure of double hammer-head configuration. As can be seen from FIG. 6, the discharge takes place in a central position.

Electrodes 6a and 10a are each positioned at the narrow sides of the rectangle according to FIG. 2 or at the ends of the hammer heads according to FIG. 5, respectively, where a great cross-sectional area for the current flow provides for low load.

The furnace according to FIGS. 1-10 is employed for the remelting of phosphate glass which is of a highly oxidizing nature, such that the temperature at the electrodes must be kept as low as possible in order to keep corrosion low.

While the melting temperatures of phosphate glass are relatively low, the specific resistance (resistivity) of such type of glass is, however, extremely small, such that relatively high currents at low voltages must be taken into consideration.

In consideration of the fact that the major part of the energy, namely for the melting of the mixture and for the vaporization of the water content, is consumed in the upper portion of the glass melting furnace or of the glass melting tank where substantially lower temperatures will be produced than in the lower portion thereof, the tank shown in FIGS. 1-10 has been divided into a pair of largely separated compartments which are interconnected by a relatively narrow passage as shown in FIG. 4 or in FIGS. 9 and 10, respectively.

By this division, it becomes possible to produce extremely high temperature differences between the upper and lower compartments or between the upper and lower portions, respectively. For example, temperatures of from 800° to 900° C. may be maintained in the upper compartment, and a level of electrical current may be maintained and adjusted which does not overload the electrodes. In such a case, the lower portion is supplied with such an amount of energy that the temperature is only increased to from 1100° C., whereby this additional temperature is produced with a relatively small amount of energy which may constitute only one-third of the energy required in the upper portion, such that regardless of the increased conductivity of the glass in the lower portion of the indicated temperature, the magnitude of current at the electrodes again may be of approximately the same value. In the present case, the term "magnitude of current" refers to the current density.

Discharge of the molten glass is effected at the bottom where the nozzle 1a is heated indirectly by conventional refractory heating means. Block 13 which is additionally mounted into the upper portion of the melting tank, has the function of effecting a concentration of energy at side bricks 12 and 15 or within the passages between bricks 12, 13 and 15, respectively, in order to avoid, at this point caking of the molten material to the side brick which would result in the formation of bridges.

Further, the conductive cross-sectional area is thereby reduced, such that a greater amount of energy is released in the central part of the tank and not at the electrodes.

In this way, it is possible to keep the temperature of the glass lower at the electrodes than in the central part of the tank, and, furthermore, due to the lateral mounting of the electrodes, these electrodes are installed into the components where only an extremely small convection current exists.

Also, this structure achieves a glass enriched with stannic/tin oxide that is concentrated directly adjacent the electrodes, whereby decomposition of the tin-oxide electrodes is greatly reduced.

Additionally, the present furnace according to FIGS. 1-10 is constructed in such a manner that a high ratio between tank surface area and tank volume is obtained, such that, on the one hand, a great melting surface is formed to which the mixture and the radioactive material in the form of a slurry or suspension are fed to thereby provide a great surface area for the vaporization of the water, whereas, on the other hand, a small volume of the furnace tank is present whereby the furnace may be compact in the construction and small in dimension and such that shielding and monitoring in hot cells is still possible.

Further, a non-illustrated superstructure is provided above the furnace according to FIGS. 11-13, which superstructure allows the sucking off by vacuum of the gases resulting from the melting of the mixture. These gases may then be cleaned, filtered or absorbed in conventional manner in order to avoid environmental pollution beyond the permissible tolerances. Such treatment of the gas is only possible in a fully electrically operated furnace because other constructions would release such volumes of the exhaust gases resulting from the combustion of oil or gas, that these gas volumes could not be treated economically or adequately any longer. As shown in FIGS. 11-13, a furnace for the melting or inclusion melting of radioactive (waste) material also may have a rectangular configuration in cross-section, with the dimension of the rectangle being reduced from above to below. The electrodes employed for the melting of the boron silicate glass may each be positioned in doubly superposed levels and mounted so as to provide for optimum uniform energy input.

In the furnace according to FIGS. 11-13, the glass to be melted is molten at a temperature of about 1300° C., and since the radioactive material is likewise present in the form of a slurry, while the concentration of slurry may be substantially lower, an auxiliary upper furnace heating system is installed into the furnace, wherein silicon carbide heater elements 21 are protected against the entry of steam by a cover 22 of Inconel and by boiler or heating tubes.

According to FIGS. 11-13, the discharge spout 19a is laterally arranged in order to facilitate the discontinuous mode of operation in which the flow of glass must be stopped quickly.

This particular problem is solved by pressing against a lateral aperture in this discharge spout brick 19, a sealing electrode 18 the tip of which has a conical configuration, such that the aperture may be sealed immediately by pressing the electrodes 18 thereagainst while the temperature within the discharge aperture, by controlling the current flow between such electrode and an electrode 24 disposed in the center of the furnace within the tank, may be maintained at a value permitting an instantaneous opening of the aperture by withdrawing said electrode 18.

In this way, "freezing" of the discharge aperture is positively prevented from occurring even in the closed condition of this aperture, and the space around the sealing electrode 18 is additionally heated by silicon carbide radiator elements 20 so as to provide for a smooth continued flow-out of the glass steam.

As mentioned above, the cross-sectional area is substantially greater in the upper portion of the tank than in the lower portion thereof in order to minimize and limit vertical variations of the glass melt level caused by the discontinuous operation, and in order to, as mentioned above, provide a greater surface area for the evaporation of the water from the suspension or from the slurry, respectively.

Tempering or start-up of the furnaces according to the invention is effected by the heater elements 20 positioned in the superstructure and by further heater elements 25 disposed in the bottom of the tank, as is customary in conventional, electrically heated glass melting furnaces. Of course, auxiliary electrodes may be used, by means of which the furnace may be operated by using glass fragments rendered conductive with the use of additives or upon melting a thin glass layer at the bottom.

The furnace according to FIGS. 11-13 is provided with a protective circuit for the molybdenum electrodes, with the counter or opposite electrode being a tin-oxide electrode 24 mounted in the center of the bottom. Protective circuits of this kind are known from prior patents.

In order that variations of weight upon discharging of the glass and upon charging with mixture or slurry can be observed accurately, the complete furnace rests upon at least four pressure gauges 23 such that the weight of the quantity discharged or fed or the variations of weight, respectively, can be determined positively.

The lateral discharge spout 19a including the sealing electrode 18 which is adjustable in its spacing with respect to the discharge spout, not only provides for the possibility of closing or sealing the discharge spout, but also for the possibility of controlling the rate of discharge by adjusting the degree of opening of the discharge spout. Thus, the temperature of the glass discharged may be controlled additionally by means of the current flow into the interior of the furnace. The further construction contemplates that the entire discharge aperture or spout may be exposed by withdrawing the heating compartment including the heater elements 20 so as to allow replacement of the discharge brick 19 with the aid of a manipulator, if required.

With respect to various structural features, further reference is made to applicant's prior patents, U.S. Pat. No. 3,742,111 issued June 26, 1973; U.S. Pat. No. 3,942,968 issued Mar. 9, 1976; U.S. Pat. No. 4,027,091 issued May 31, 1977; and co-pending application Ser. No. 804,405 filed June 7, 1977, regarding the current supply to ceramic electrodes, a vertical electrical melting furnace, and a furnace for melting of mineral substances.

Considered on the whole, it may be stated that the two above embodiments of the furnace according to the invention for the inclusion melting of glass and highly radioactive components for the first time allow one to produce, in a safe and easy manner, solid materials from the highly radioactive waste materials such that safe storing of such waste materials for maximum periods of time is rendered possible.

As stated above, the mixture (frit) and slurry containing radioactive components have been arbitrarily differentiated; of course, the complete feed may consist of such slurry or suspension provided that a sufficient quantity of glass yielding constituents is contained therein. In a further embodiment, it is naturally possible also to mix slurry and a glass mixture of the conventional type prior to the feeding thereof into the furnace.

What is claimed is:

1. A method of inclusion melting of glass with radioactive components, particularly from the reprocessing of nuclear fuel elements, comprising: feeding radioactive components in the form of one of an aqueous solution or of a slurry into a furnace from above in combination with a mixture suitable for the melt-forming of glass; and heating the molten mass of glass and radioactive components by passing electrical current directly therethrough, wherein the mass flow takes place solely vertically from top to bottom.

2. The method according to claim 1, wherein the step of feeding comprises feeding the mixture for the melt-forming comprising the radioactive components.

3. The method according to claim 1, wherein the passing of current through the melt is effected by providing electrodes in contact with said melt.

4. The method according to claim 3, comprising effecting small convection currents only in the upper portion of the furnace tank adjacent the electrodes, and providing a higher energy concentration in the upper portion of the central part of the furnace than at the edges thereof.

5. A furnace for the inclusion melting of glass with radioactive components comprising furnace walls composed of ceramic materials; means for feeding a mixture of radioactive components in the form of one of an aqueous solution or of a slurry and a melt-forming mixture from above; a plurality of pressure gauges on which the furnace is mounted for positively determining the weight of the quantity fed into and discharged from the furnace; means for heating the mixture comprising electrodes in the walls and in contact with the melt and composed of one of tin-oxide or molybdenum; and wherein said furnace has in its upper portion below the mixture blanket a greater cross-sectional area than in at least one of the portions therebelow and the mass flow takes place solely vertically from top to bottom.

6. The furnace according to claim 5, wherein said electrodes are positioned in the area of a large cross-section of the furnace, within recesses, at the narrow sides of the furnace.

7. The furnace according to claim 6, wherein the central part of the furnace includes a reduction in cross-section which reduces the cross-sectional areas of the current paths.

8. The furnace according to claim 5, further comprising a glass outlet in a discharge brick provided with an electrode in the form of a sealing brick adapted to be pressed thereagainst from the outside, and radiator and heater elements positioned exteriorly in front of the outlet and discharge brick.

9. The furnace according to claim 8, wherein said discharge brick is replaceable.

10. The furnace according to claim 5, further comprising upper furnace heating means being protected against the entry of steam.

11. The method according to claim 1, wherein the radioactive components are fed into a furnace having walls composed of ceramic materials.

* * * * *